US010755088B2

(12) United States Patent
Chawla et al.

(10) Patent No.: US 10,755,088 B2
(45) Date of Patent: Aug. 25, 2020

(54) AUGMENTED REALITY PREDICTIONS USING MACHINE LEARNING

(71) Applicant: Adobe Inc., San Jose, CA (US)

(72) Inventors: Kushal Chawla, Karnataka (IN); Vaishnav Pawan Madandas, Mumbai (IN); Moumita Sinha, Kolkata (IN); Gaurush Hiranandani, Urbana, IL (US); Aditya Jain, Madhya Pradesh (IN)

(73) Assignee: ADOBE INC., San Jose, CA (US)

( * ) Notice: Subject to any disclaimer, the term of this patent is extended or adjusted under 35 U.S.C. 154(b) by 346 days.

(21) Appl. No.: 15/868,531

(22) Filed: Jan. 11, 2018

(65) Prior Publication Data

US 2019/0213403 A1 Jul. 11, 2019

(51) Int. Cl.
*G06K 9/00* (2006.01)
*G06T 19/00* (2011.01)
*G06Q 30/02* (2012.01)
*G06Q 30/06* (2012.01)
*G06N 20/00* (2019.01)

(52) U.S. Cl.
CPC ..... *G06K 9/00335* (2013.01); *G06K 9/00288* (2013.01); *G06K 9/00302* (2013.01); *G06K 9/00671* (2013.01); *G06Q 30/02* (2013.01); *G06Q 30/0201* (2013.01); *G06Q 30/0271* (2013.01); *G06Q 30/0643* (2013.01); *G06T 19/006* (2013.01); *G06N 20/00* (2019.01)

(58) Field of Classification Search
None
See application file for complete search history.

(56) References Cited

U.S. PATENT DOCUMENTS

2005/0289582 A1* 12/2005 Tavares .............. G06K 9/00221
725/10
2010/0086215 A1* 4/2010 Bartlett .............. G06K 9/00335
382/197

(Continued)

OTHER PUBLICATIONS

Mcduff, Daniel, et al., "Predicting Ad Liking and Purchase Intent: Large-Scale Analysis of Facial Responses to Ads", IEEE Transactions on Effective Computing, vol. 6, Issue 3, Jul.-Sep. 2015, 13 pages.

(Continued)

*Primary Examiner* — Mark Roz
(74) *Attorney, Agent, or Firm* — Kilpatrick Townsend & Stockton LLP (57) ABSTRACT

Systems and methods are disclosed herein for determining user behavior in an augmented reality environment. An augmented reality application executing on a computing system receives a video depicting a face of a person. The video includes a video frame. The augmented reality application augments the video frame with an image of an item selected via input from a user device associated with a user. The augmented reality application determines, from the video frame, a score representing an action unit. The action unit represents a muscle on the face of the person depicted by the video frame and the score represents an intensity of the action unit. The augmented reality application calculates, from a predictive model and based on the score, an indicator of intent of the person depicted by the video.

17 Claims, 6 Drawing Sheets

(56) References Cited

U.S. PATENT DOCUMENTS

2015/0279113 A1* 10/2015 Knorr .................. G06T 7/11
 345/633
2015/0324632 A1* 11/2015 Whitehill ........... G06K 9/00281
 382/159

OTHER PUBLICATIONS

Baltrusaitis, Tadas, et al., "Cross-Dataset Learning and Person-Specific Normalisation for Automatic Action Unit Detection", Automatic Face Gesture Recognition (FG), 2015 11$^{th}$ IEEE International Conference and Workshops, Oct. 1, 2015, 6 pages.
Ekman, Paul, et al., "Measuring Facial Movement", Journal of Nonverbal Behavior, Environmental Psychology and Nonverbal Behavior, vol. 1, 1976 and vol. 41, 2017, Springer US, pp. 56-75.
Baltrusaitis, Tadas, et al., "Openface: An Open Source Facial Behavior Analysis Toolkit", Applications of Computer Vision (WAVC), IEEE Winter Conference, May 2016, 10 pages.
O'Brien, Cory, "The Future of Ads", http://thefutureofads.com/ray-ban-uses-augmented-reality-for-their-virtual-mirror, 2018, accessed Jan. 11, 2018, 3 pages.
Augment, "3 Retail Giants Who Used Augmented Reality to Sell", Blog, http://www.augment.com/blog/3-consumer-giants-who-used-augmented-reality-for-retail, Mar. 22, 2016, accessed Jan. 11, 2018, 5 pages.
Paul Elman Group, "Facial Action Coding Sytem", https://www.paulekman.com/product-category/facs/, Blog, 2018, accessed Jan. 11, 2018, 1 page.

* cited by examiner

ND MACHINE LEARNING

AUGMENTED REALITY PREDICTIONS USING MACHINE LEARNING

TECHNICAL FIELD

This disclosure relates generally to augmented reality systems. More specifically, but not by way of limitation, this disclosure relates to using predictive models to predict user behavior from video data gathered via an augmented reality system.

BACKGROUND

Computing systems can be used to understand user behavior. For example, a computing system can predict whether a user will perform a desired outcome, such as whether a user conversion will occur when the user is exposed to targeted content. With the results of the prediction, an operator can configure a computing system to send relevant targeted content to user devices.

In particular, by analyzing video interactions, augmented reality systems can provide a better understanding of user behavior, leading to content with higher relevance and therefore a more efficient use of computing resources. Augmented reality systems capture video of a person or a scene, and play an augmented scene back in real time. For example, an augmented reality system captures video of an individual, creates a three-dimensional model of the individual's face, and superimposes additional items such as a pair of sunglasses or a hat.

Existing solutions for augmented reality are inadequate for generating input usable by computing systems to direct future targeted content. Such solutions are unable to reliably visualize an item in real time, unable to predict user behavior, or unable to provide recommendations to a user. Accordingly, solutions are needed in order for real-time augmented reality systems to better understand user behavior and provide improved targeted content that increases the efficiency of computing resources.

SUMMARY

Systems and methods are disclosed herein for determining user behavior in an augmented reality environment. An augmented reality application executing on a computing device receives a video depicting a face of a person. The video includes a video frame. The augmented reality application augments the video frame with an image of an item selected via input from a user device associated with a user. The augmented reality application determines, from the video frame, a score representing an action unit. The action unit represents a muscle on the face of the person depicted by the video frame and the score represents an intensity of the action unit. The augmented reality application provides the score to a predictive model. The augmented reality application calculates, from the predictive model and based on the score, an indicator of intent of the person depicted by the video. The augmented reality application displays the indicator of intent on a user interface.

These illustrative embodiments are mentioned, not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Embodiments of the present disclosure include systems and methods for using augmented reality to predict user behavior and determine relevant targeted content to users. An augmented reality system enables users to visualize an item by providing real-time video feedback to customers and enables an operator to predict whether a user is likely to purchase an item. The augmented reality system receives video of a person from a digital video camera and analyzes a set of action units on the video of the person's face to capture part of a facial expression. An action unit represents a muscle on a person's face depicted in a video. For example, an action unit can be "cheek raiser," or "lip pucker." The augmented reality application determines a score that corresponds to an intensity of the particular facial expression and provides the score as an input to a trained predictive model such as a machine learning model. The predictive model predicts the person's receptivity to targeted content.

In an example, an augmented reality application executing on a computing device such as a smart phone receives input from a user to navigate to an online sunglasses store to evaluate several different pairs of glasses. The augmented reality application receives real-time video of the person captured by a video camera on the device. The augmented reality system presents the video stream back to the user in real-time. The augmented reality application also receives a selection of an item, such as a pair of sunglasses, for evaluation, and downloads a three-dimensional ("3-D") model of the sunglasses from the online store's webpage. Based on the selection, the augmented reality application replicates the person's image, or persona, on a display screen of the computing device, and updates the video with the selected sunglasses superimposed onto the individual's persona. This allows the user to assess the appearance of his or her face with the selected pair of sunglasses without actually trying on the sunglasses.

Through this process, the augmented reality application analyzes the video and determines the significance of the user's facial features. More specifically, by analyzing several action units, the augmented reality system quantifies the user's facial expressions by generating a signal of intensity. A signal of intensity represents the strength of the facial feature (e.g., slightly smiling could be low on a scale, and really happy could be high on the scale). By using a combination of action units, multiple facial features are represented, and the augmented reality application obtains a bigger picture of the user's facial expressions.

The augmented reality application provides the signal of intensity for each action unit as inputs to a trained predictive model. From the intensities, the trained predictive model determines the intent of the user. The predictive model can predict whether the user will be receptive to additional recommendations. For example, if the augmented reality application determines that the user is happy while trying on the pair of sunglasses, then the augmented reality application might conclude that the user likes the pair of sunglasses.

Embodiments described herein provide improvements to the technological field of augmented reality. As discussed, existing solutions are unable to reliably visualize an item in real time using augmented reality or are unable to predict user behavior resulting from interactions in an augmented reality environment. For example, an augmented reality application provides an augmented reality experience based on video frames captured from a camera. The augmented reality application develops and uses a set of rules to determine user behavior based on facial motions defined by action units. As explained further, the augmented reality application analyzes specific behavior defined by action units, combines scores obtained from that analysis in a specific manner, and uses a trained predictive model to determine a user's intent. The augmented reality application and predictive model adjust for the fact that different rules may apply in different circumstances (e.g., a user may react differently to different items that are shown in the augmented reality environment).

Figure 1:
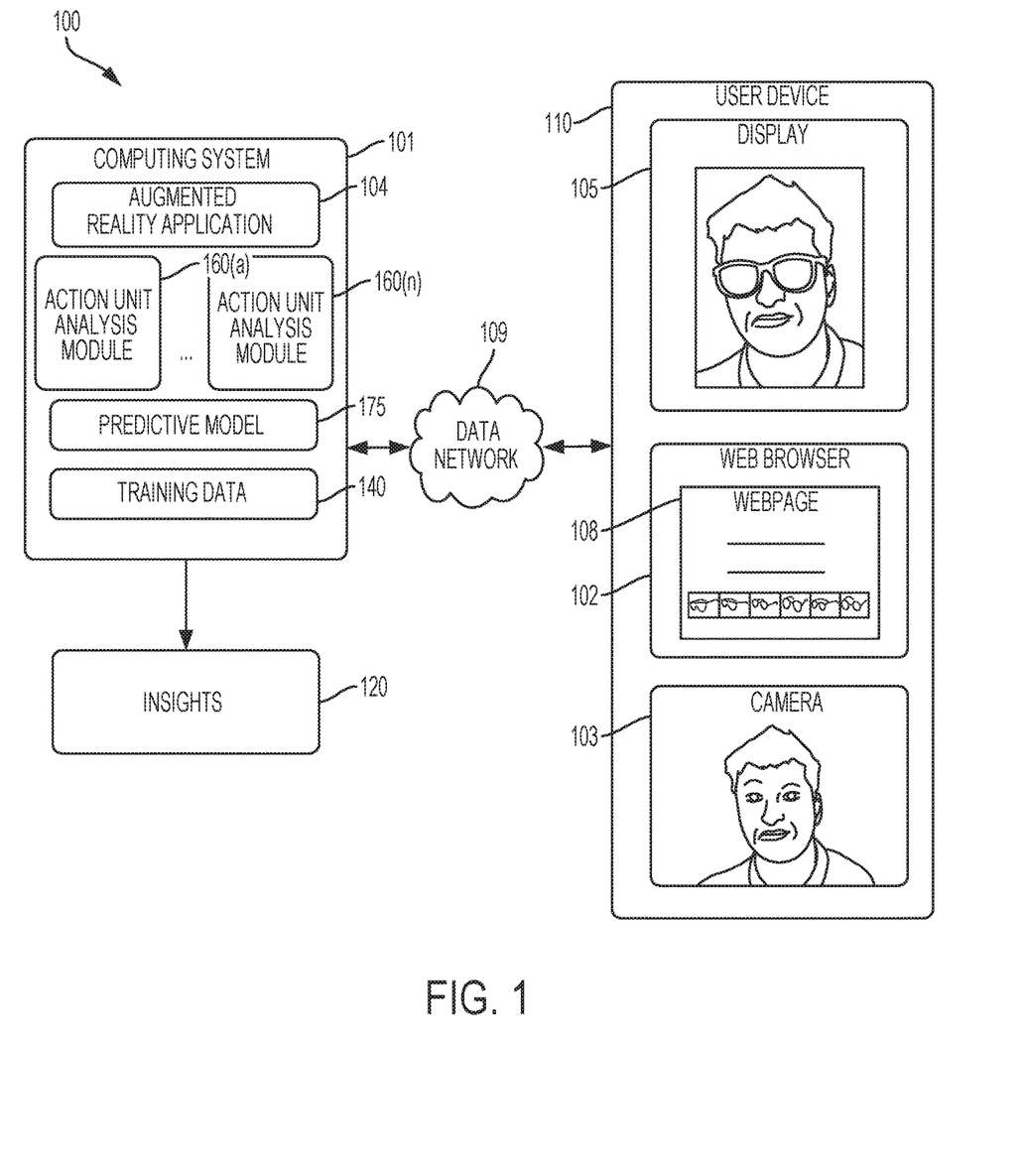
FIG. 1 depicts an augmented reality environment, according to certain embodiments of the present disclosure.

Turning now to the figures, FIG. 1 depicts an augmented reality environment, according to certain embodiments of the present disclosure. FIG. 1 depicts an augmented reality environment 100 that provides insights based on user interactions detected via augmented reality. Augmented reality environment 100 includes computing system 101, user device 110, data network 109, and insights 120. User device 110 captures input from a user. Computing system 101 processes the input and provides feedback to user device 110 and insights 120 to an operator.

User device 110 includes display 105, web browser 102, and camera 103. As depicted, user device 110 is a separate device from computing system 101. User device 110 and computing system 101 are shown connected across data network 109, but other configurations are possible. For example, user device 110 can include the components of computing system 101 and provide insights 120 across data network 109 to an operator. Similarly, display 105, web browser 102, and camera 103 need not all be on the same physical device. Functionality performed on computing system 101 can also instead be performed on user device 110 and vice versa. For example, augmentation functionality can be performed on either computing system 101 or user device 110.

Display 105 is any display configurable to display real-time video. For example, display 105 can be a touch-screen display, LCD display, LED display, etc. Display 105 may be a virtual display such as a display in a web-browser or mobile application.

Web browser 102 is configurable to display webpage 108. Web browser 102 can be any web browser such as Internet Explorer® or Chrome®. Webpage 108 includes information relevant to a user of the augmented reality environment 100, such as different objects for selection to view in augmented reality. For example, webpage 108 can be a web page of a business providing augmented reality product evaluations. Web browser 102 can perform operations such as receiving requests to create accounts, evaluate products, or select products for display in the augmented reality environment 100.

Camera 103 can be any camera configurable to capture real-time video, for example, a digital video camera that can operate at 20 frames per second or 60 frames per second. Camera 103 can be a camera on a smart-phone or a camera on a laptop or desktop computer.

Computing system 101 includes augmented reality application 104, training data 140, action unit analysis modules 160a-n, and predictive model 175. Augmented reality application 104 executing on computing system 101 trains predictive model 175 with training data 140. Computing system 101 receives video from camera 103 sent by the user device 110 over data network 109 and determines insights 120 into user behavior by using action unit analysis modules 160a-n and predictive model 175. Computing system 101 provides augmented reality video to user device 110 for display on display 105.

Augmented reality application 104 analyzes the video received from camera 103 by using one or more action unit analysis modules 160a-n. Each action unit analysis module 160a-n receives video and analyzes the received video for an action unit, i.e., a facial muscle. Each action unit analysis module 160a-n provides an intensity score that corresponds to an intensity of a particular facial expression. Action unit analysis modules 160a-n can be implemented as software applications executing on computing system 101 or on a dedicated hardware processor such as an Application Specific Integrated Circuit (ASIC).

In an example, augmented reality application 104 analyzes the behavior of a user during the user's evaluation of an item. A user operating user device 110 logs onto webpage 108 using web browser 102. Webpage 108 is operated by an operator, e.g., an online vendor of sunglasses. The user holds the camera up to his or her face and camera 103 captures some video. User device 110 transmits the captures video from camera 103 and sends the video across data network 109 to computing system 101.

Augmented reality application 104 receives the video and evaluates the behavior of the user, such as how the user reacts. Augmented reality application 104 can use different lengths of time in the evaluation, such as a frame, several frames, or several minutes. Insights 120 can be gained from video frame and then adjusted based on future frames. Insights 120 can also be computed by the augmented reality application 104 by examining video of a user before and after he or she tries on the item to be evaluated.

User device 110 receives an interaction with the webpage 108 from the user. The user selects an item, such as a pair of sunglasses, for evaluation. Augmented reality application 104 continues to process the video of the user, augments the video with the selected sunglasses, and sends the video back to the user device 110, which displays the video on display 105. As can be seen in FIG. 1, display 105 shows an image that includes a subject wearing a pair of sunglasses.

More specifically, augmented reality application 104 receives the captured video and provides the video to the action unit analysis modules 160a-n. For example, in a system configured to analyze three action units using three action units analysis modules. A first action unit analysis module 160*a* examines the video for raised eyebrows, a second action unit analysis module 160*b* examines the video for expressions in the cheeks of the user, and a third action unit analysis module 160*c* examines the video to detect expressions in the lips of the user—e.g., a smile.

Augmented reality application 104 provides the outputs of the action unit analysis modules 160*a*-*n* to the trained predictive model 175. Based on the training of the model, predictive model 175 outputs the augmented reality application 104 provides insights 120 about a user. Insights 120 can include a prediction of user intent or whether the user likes the item viewed in the augmented reality environment. Insights 120 help computer operators provide the most appropriate targeted content to a user.

As discussed further herein, training the predictive model 175 involves providing training data 140 to the predictive model. Training data 140 includes instances of observed user behavior and outcomes for the behavior. For example, an instance of training data 140 could be data representing a test subject's facial expressions when looking at him or herself evaluating a particular object and how the subject responds to the particular object.

Figure 2:
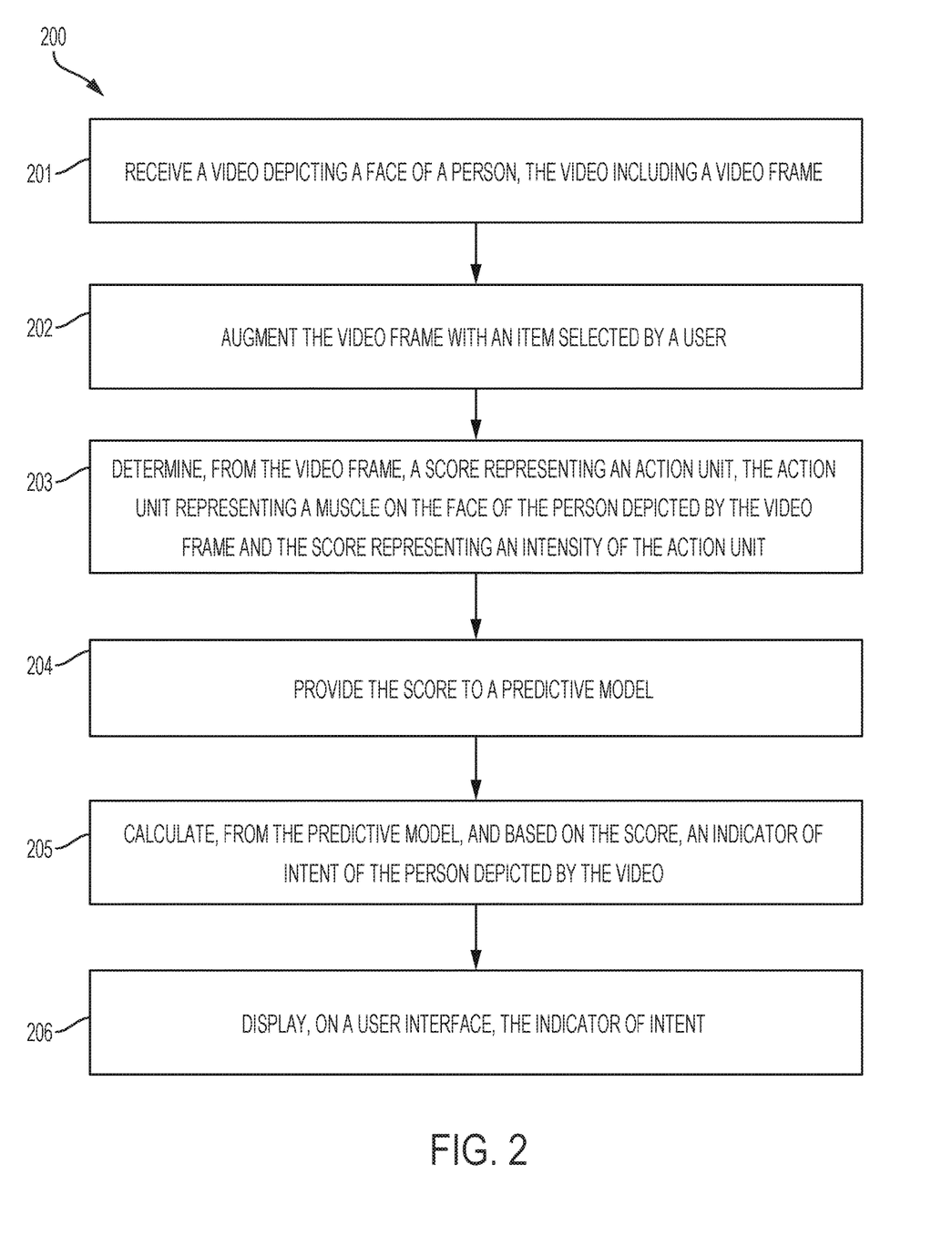
FIG. 2 is a flowchart showing a method of operating an augmented reality system, according to certain embodiments of the present disclosure.

FIG. 2 is a flowchart showing a method of operating an augmented reality system, according to certain embodiments of the present disclosure. As discussed, augmented reality application can analyze the behavior of a user before, during, and after a user evaluates an item. Augmented reality application 104 uses predictive model 175 to determine user insights based on the evaluation. The user may view the augmented reality video (i.e., the user with the item) back to the user for evaluation.

At block 201, method 200 involves receiving video depicting a face of a person, the video including a video frame. In an example, the user holds a camera 103 up to his or her face and camera 103 captures a video frame. User device 110 transmits the captured video frame from camera 103 and sends the video across data network 109 to computing system 101.

At block 202, method 200 involves augmenting the video frame with an item selected by a user. Webpage 108 receives a selection of an item for evaluation, for example, a pair of dark sunglasses. The augmented reality application 104 receives this selection and the captured video frame.

The augmented reality application 104 retrieves a three-dimensional model corresponding to the sunglasses from storage or memory. The augmented reality application 104 creates a three-dimensional model of the user depicted in the video and merges the model with the model of the sunglasses. The augmented reality application 104 thereby augments the video frame with the sunglasses and sends the video back to the user device 110, which displays the video on display 105. As can be seen in FIG. 1, display 105 shows an image that includes the subject wearing the selected sunglasses.

The augmented reality application 104 augments the video in real-time and updates the video as new video frames arrive. With real-time updates, the user can visualize how he or she looks with the selected item superimposed on his or her face. The augmented reality environment 100 is interactive and can update the video in real time as the user moves his or head. For example, if the user moves his or her head to the right, then the augmented reality application 104 updates the representation accordingly and sends updated video back to user device 110. User device updates the video on the display 105. Continuing with the example, the video shows the sunglasses moving with the user similar to how the user would perceive movement if the user were trying the sunglasses on in front of a mirror.

At block 203, method 200 involves determining, from the video frame, a score representing an action unit, the action unit representing a muscle on the face of the person depicted by the video frame and the score representing an intensity of the action unit. As discussed, an action unit represents a muscle on a person's face. For example, an action unit may be a "cheek raiser."

Each action unit ("AU") can be defined and numbered according to the Facial Action Coding System. For example, AU 02 is an "Outer Brow raiser," AU 04 is a "Brow lowerer," and AU 44 is a "Squint." In combination, multiple action units can provide greater insights into facial expressions. For example, in combination, AU 04 "brow lowerer," AU 05 "upper lid raiser," AU 07 "lid tightener" and AU 23 "lip tightener" may indicate anger. Similarly, happiness or joy may be indicated by AU 06 "cheek raiser" and AU 12 "lip corner puller."

Augmented reality application 104 uses one or more action unit analysis modules 160*a*-*n* to analyze the action units present in a video frame. Each action unit analysis module 160*a*-*n* receives video from the user device 110, e.g., video received from camera 103. analysis modules 160*a*-*n* provide a score that represents the intensity of the particular action unit being analyzed. In some embodiments, the scores for different action units may be combined before being provided to the predictive model 175. In the example of happiness or joy, the intensity scores for AU 06 and AU 12 can be combined to provide an intensity for happiness or joy.

Action unit analysis modules 160*a*-*n* can be implemented via various software packages such as OpenFace. OpenFace can analyze 17 AUs in real time. OpenFace provides an occurrence detection (i.e., whether a face was detected in the video frame) and an intensity estimation, or score, of a facial expression.

Each of action unit analysis modules 160*a*-*n* can output a time series of the corresponding intensity score on a frame-by-frame basis. A time series has one data element for every frame of video. For example, with intensity scores on a scale of 1-10, an example time series for an action unit could be 1, 6, 10, 6, and 2 where each number represents an intensity score for each frame. Meaningful time series data can be obtained over a short period of time. For example, for a camera 103 operating at twenty-five frames per second over twenty seconds, five-hundred frames of video are gathered, resulting in a time series of length five-hundred.

As discussed, action unit analysis modules 160*a*-*n* can detect when a face is present in a video frame. Augmented reality application 104 can filter out or ignore time series data corresponding to video frames that do not include a face and therefore do not provide an action unit intensity score.

Augmented reality application 104 may use scores from one or more action unit analysis modules 160*a*-*n*. In some embodiments, augmented reality application 104 may determine that only a subset or even just one action unit is relevant to the particular product being evaluated. Accordingly, in some embodiments, augmented reality application 104 may confine analysis to a subset of all available action units or only one action unit.

In some embodiments, augmented reality application 104 can derive statistics from the time series data. For example, augmented reality application 104 can calculate statistics such as the mean, medium, interquartile range, maximum, or minimum of the intensity scores in the time series. The intensity scores can be further refined using various statistical tests such as the Kolmogorov Smirnov test and KL divergence.

At block 204, method 200 involves providing the score to a predictive model. The augmented reality application provides the intensity score for a video frame to the predictive model 175. Different models can be used, such as linear regression or random forests. Predictive model 175 is trained with training data 140 using a method such as method 400 depicted in FIG. 4. Training data 140 includes instances of observed user behavior and outcomes for the behavior.

The predictive model is trained to predict an indicator of intent based on one or more action unit intensity scores. The determined indicator of intent may be based on one intensity score that corresponds to one action unit, multiple intensity scores that correspond to multiple action units, or a composite score derived from multiple scores.

Additionally, user intent can be predicted on a per-frame basis or over several frames. Augmented reality application 104 can provide a time series of scores to the predictive model together or separately.

At block 205, method 200 involves calculating, from the predictive model, and based on the score, an indicator of intent of the person depicted by the video. Predictive model 175, trained to predict user intent from action unit intensity scores, outputs an indicator of intent based on the video frame.

An indicator of intent can strongly correlate with the intensity score representing one action unit, or can be a function of intensity scores that each represent different action units. For example, a "brow raiser" may indicate purchase intent for a particular type of item. Therefore, in certain embodiments, the outcome of the predictive model 175 may be largely or entirely based on the output of one of the action unit analysis models 160a-n.

Figure 3:
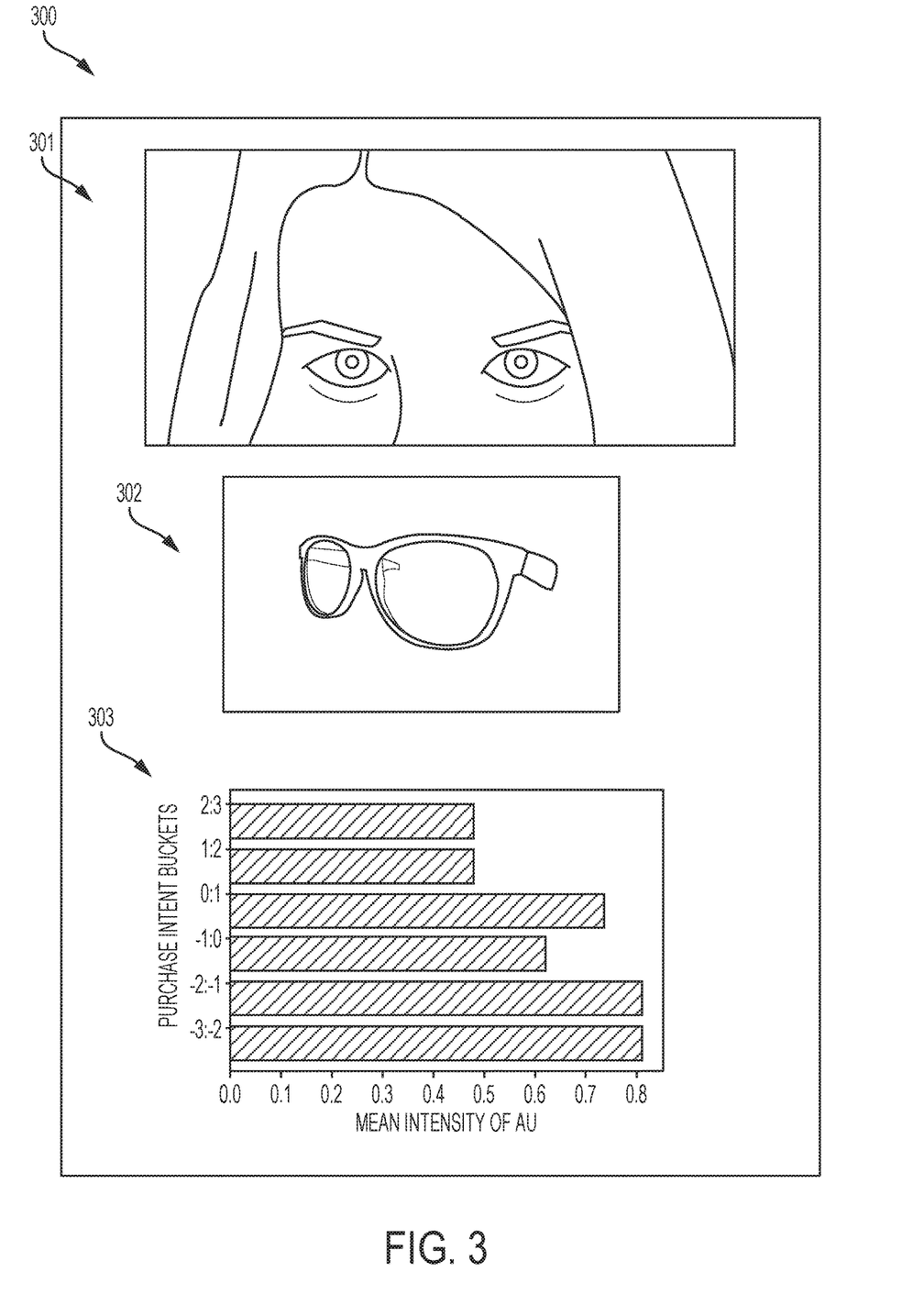
FIG. 3 depicts correlations between intensity of an action unit, an example item, and intent, according to certain embodiments of the present disclosure.

FIG. 3 depicts correlations between intensity of an action unit, an example item, and intent according to certain embodiments of the present disclosure. FIG. 3 includes interface 300 that depicts facial features 301 that correspond to an action unit, an example item 302, and a graph 303. In this example, the facial features in 301 correspond to "AU 01," which is an "inner brow raiser." As can be seen, the subject in the photo is raising her eyebrows. Example item 302 is a pair of black sunglasses. As discussed, user intent can depend on the item shown to the user.

Augmented reality application 104 receives video frames of a user, analyzes the facial features as depicted in 301 (i.e., those that correspond to AU 01) as a result of exposure to augmented reality video that includes item 302, and collects a time series of intensity scores that correspond to AU 01.

Graph 303 shows results from analysis performed by augmented reality application 104. Graph 303 depicts a mean action unit intensity versus purchase intent for the item 302 as measured by the facial features depicted in 301. The mean purchase intent is computed based on one or more frames of augmented reality video.

More specifically, graph 303 shows the mean intensity of the action unit score for AU 01 over the time series measured on a scale from 0 to 0.8 on the horizontal axis. Augmented reality application 104 has analyzed a user for multiple frames, the average of which is combined into an aggregate purchase intent. The aggregate purchase intent is shown combined into buckets measured on a scale from −3 to 3, with the scores collected in six buckets (e.g., −3 to −2, −2 to −1, etc.), where −3 indicates the lowest probability that a user will want to make a purchase, and 3 indicates the highest probability that a user will want to make a purchase.

As can be seen in FIG. 3, purchase intent increase is inversely related to the mean intensity for AU 01. In this example, as the intensity decreases, purchase intent increases. But relationships between different items and action unit intensity may be different. For example, purchase intent may be a function of the time series scores of multiple action units. Different action units can play larger or smaller roles, depending on the product shown.

With other relationships between action unit intensity and products, the correlation may be different. Such a relationship can be a multi-dimensional relationship, in which the scores from different action units play a smaller or greater role.

Returning to FIG. 2, at block 206, method 200 involves displaying on a user interface, the indicator of intent. Based on the indicator of intent, augmented reality application can provide product recommendations or take other action. As discussed, purchase intent can be a score, such as over the range −3 to 3. Purchase intent can be grouped into buckets to simplify analysis. At block 206, augmented reality application 104 provides the purchase intent to an operator of the computing system.

Augmented reality application 104 may also provide personalized recommendations to the user on the basis of the determined purchase intent. For instance, if the customer shows a high inclination towards a particular product, as predicted by the predictive model 175 when compared to other users, then augmented reality application 104 can provide similar products as shown to be appropriate for other users.

Figure 4:
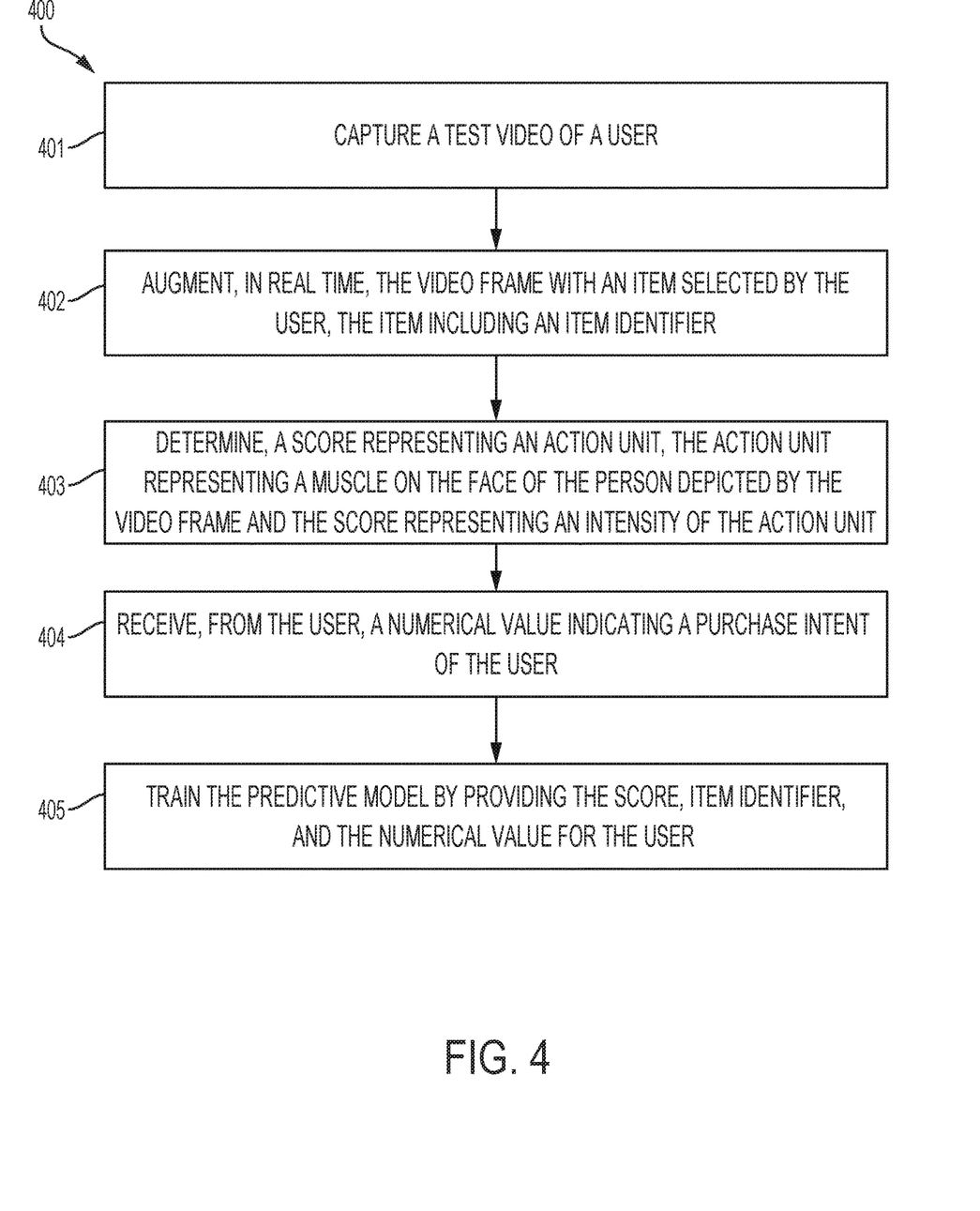
FIG. 4 is a flowchart showing a method of training a predictive model of an augmented reality system to predict purchase intent based on facial features, according to certain embodiments of the present disclosure.

Predictive model 175 can be trained by various methods. FIG. 4 is a flowchart showing a method of training a predictive model of an augmented reality system to predict purchase intent based on facial features, according to certain embodiments of the present disclosure. Method 400 involves providing an augmented reality experience that includes, for a number of users, a product item to users who provide their willingness to purchase the item.

An augmented reality experience used to gather training data can be obtained by a training data generation system such as Amazon Mechanical Turk®. Human subjects can be used to generate training data. Subjects evaluate items using a virtual reality system and rate their willingness to purchase the items. For example, users are each asked to rate purchase intent on a continuous scale, e.g., −3 to 3. The phrasing of the question can vary. An example question is "Suppose the product shown is available at an affordable price. Rate your willingness to purchase, with −3 the lowest and 3 the highest." Training is performed on a product-by-product basis. For example, a user evaluates a first product, rates their willingness to purchase, then evaluates a second product, etc. Training of the predictive model 175 can be done using user device 110 or on another computing system.

At block 401, method 400 involves capturing a test video of each user. A test camera such as camera 103 captures video and sends the video across data network 109 to computing system 101.

At block 402, method 400 involves augmenting, in real time, the video frame with an item selected by the user, the item including an item identifier. User device 110 receives a selection of an item for evaluation, for example a pair of dark sunglasses. The augmented reality application 104 receives this selection and the captured video frame. The augmented reality application 104 updates the captured video frame with a representation of the item selected by the user.

At block 403, method 400 involves determining a score representing an action unit, the action unit representing a muscle on the face of the person depicted by the video frame and the score representing an intensity of the action unit.

Augmented reality application 104 uses one or more action unit analysis modules 160a-n to analyze the action units present in a video frame. Each action unit analysis modules 160a-n provides a score for every frame indicating the intensity of the facial expression of the corresponding action unit. The scores can be combined into a time series of intensity values.

At block 404, method 400 involves receiving, from the user, a numerical value indicating a purchase intent of the user. The user ranks his or her willingness to purchase the item shown in augmented reality. The numerical value is provided to the predictive model at block 405.

At block 405, method 400 involves training the predictive model by providing the score, product identifier, and the numerical value for the user. Based on the time series of intensity values scores and the numerical value indicating intent, the predictive model 175 learns to predict whether a particular time series of intensity values measured by an individual who evaluates an item in augmented reality determines a willingness to purchase an item.

Because error can be introduced into the generation of training data, accommodations are made to minimize error. As can be expected, obtaining training data from individuals willing to participate in an augmented reality experience with compensation can be problematic. For example, users charged with generating training data may provide inaccurate or dishonest answers. Therefore, in some embodiments, additional questions can be included to help ensure the training data accuracy such as verifying the details of the product to ensure that the person providing the data was doing so accurately and honestly.

Additionally, training data gathered from users may include carry-over effects. Carry-over effect is when the treatment of showing one product affects the treatment of the next product shown. For example, a computing system presents, by augmented reality, a sequence of items to a user in order to record and analyze the user's reaction to each item. A user may have a strong reaction, positive or negative, to an item first presented. This reaction may bias the individual as he or she evaluates the second item. For example, a user may strongly dislike the first item, and consequently attribute an erroneously high score to a second presented item that would be given a low score if presented to the user independently. Also, when presented with a sequence of items, a user's expression from a first item may linger when evaluating a second item. Additionally, a user's perception of an item can be based on how the item was presented to the user.

Figure 5:
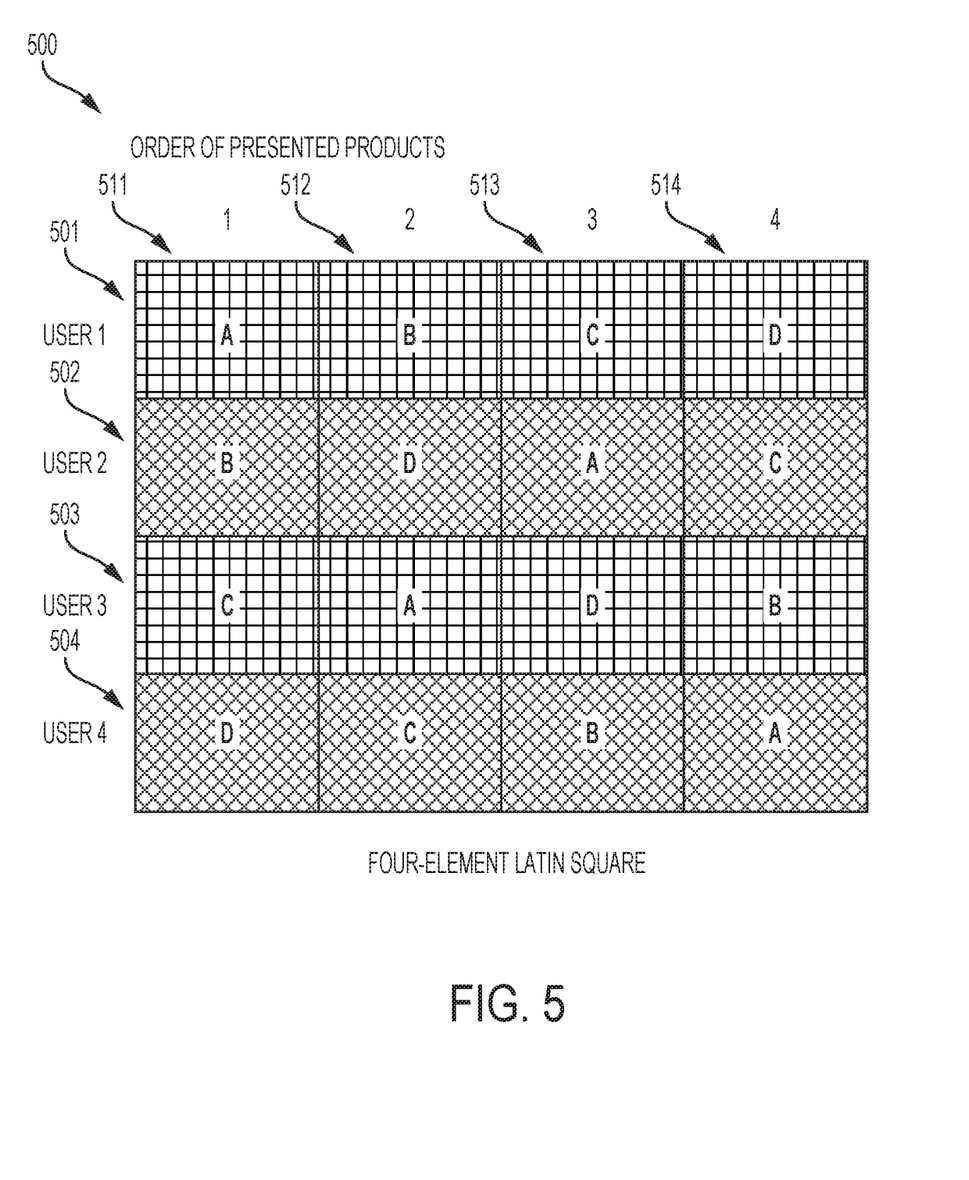
FIG. 5 is a diagram depicting a Latin square as used to generate training data for a predictive model, according to certain embodiments of the present disclosure.

Using a Latin square is one method to reduce these effects by varying the order of the products presented. A Latin square can be used to vary the item selection between users to minimize carryover effects and bias. FIG. 5 is a diagram depicting a Latin square as used to generate training data for a predictive model, according to certain embodiments of the present disclosure.

FIG. 5 depicts a Latin square 500 with four rows 501-504 and four columns 511-514. As shown, four users 1-4 are responsible for generating training data, e.g., evaluating products and providing an indication of whether they would buy the product. The values in the squares indicate the product that is presented to a particular trainer at a particular time. Columns 511-514 represent the ordering. Rows 501-504 each represent a particular user 1-4.

As can be seen, different users are presented with products in different orders. Presenting items to users according to the Latin square allows for correction of user biases, and obtains an optimum number of sequences to correct for lingering effects. For example, user 501 is shown product A, then product B, then product C, then product D. User 502 is first shown product B, then product D, then product A, then product C. User 503 is first shown product C, then product A, then product D, then product B. User 502 is first shown product D, then product C, then product B, then product A. Using a Latin square ensures that differences in users (e.g., disposable income, age, race, style, etc.) are normalized.

To further ensure quality training data, a washout product ("item W") can be added. A washout product is a product presented to a user but for which the data is not recorded. For example, a first product can be presented to each user without recording the results. The washout concept can be used in conjunction with the Latin square. For example, user 1 can be shown item W, then item A, then item B, then item C, then item D. The results for item W are disregarded. This method further reduces the risk of bias.

Figure 6:
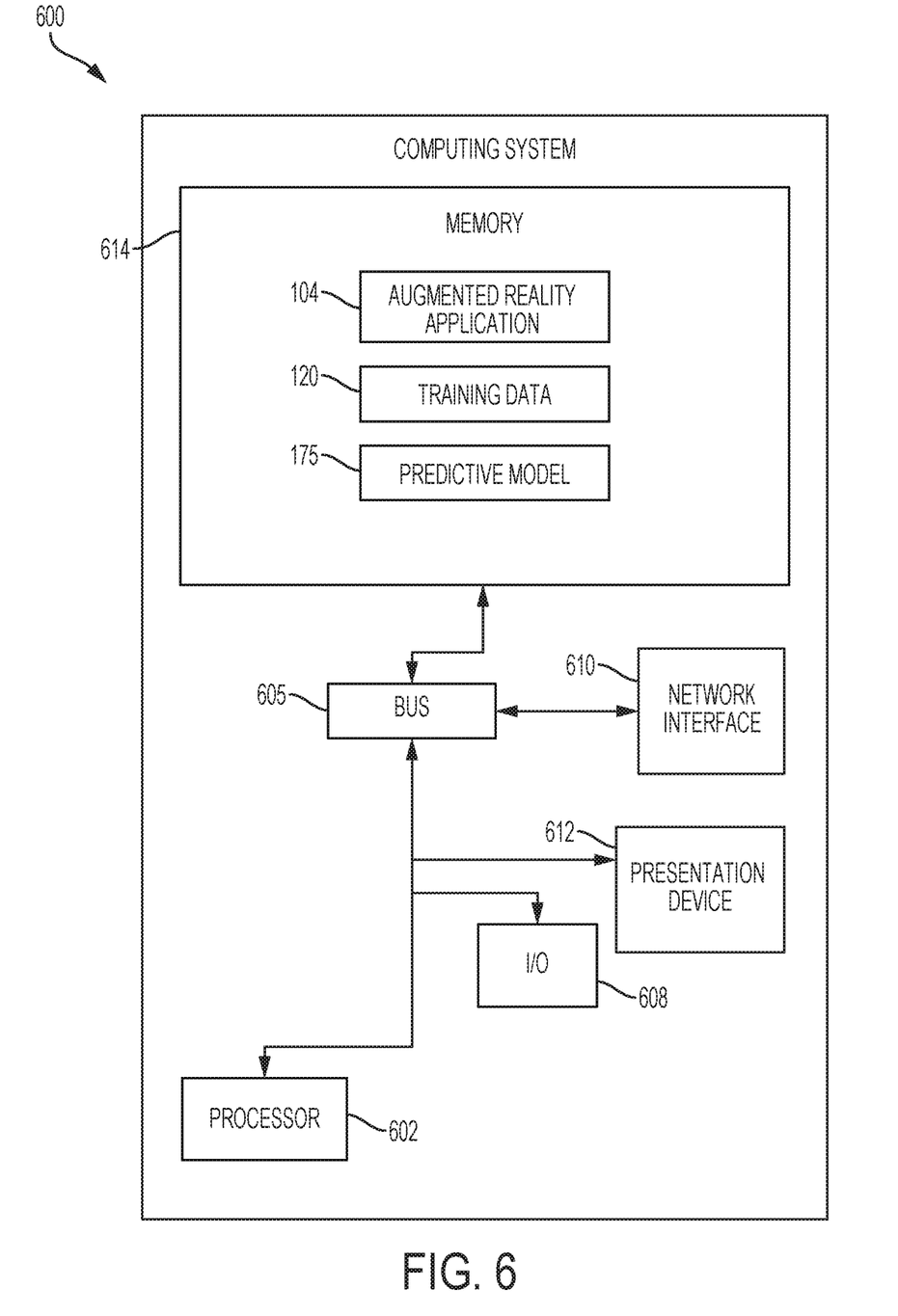
FIG. 6 depicts an example of a computing system for using a predictive model of an augmented reality system to predict purchase intent based on facial features, according to certain embodiments of the present disclosure.

FIG. 6 depicts an example computing system for using a predictive model of an augmented reality system to predict purchase intent based on facial features, according to certain embodiments of the present disclosure. Some of the components of the computing system 600 can belong to the computing system 101 of FIG. 1. For example, the augmented reality application 104 may operate on the computing system 600. The computing system 600 includes one or more processors 602 communicatively coupled to one or more memory devices 614. The processor 602 executes computer-executable program code, which can be in the form of non-transitory computer-executable instructions, stored in the memory device 614, accesses information stored in the memory device 614, or both. Examples of the processor 602 include a microprocessor, an application-specific integrated circuit ("ASIC"), a field-programmable gate array ("FPGA"), or any other suitable processing device. The processor 602 can include any number of processing devices, including one.

The memory device 614 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices such as input or output devices. For example, the computing system 600 is shown with an input/output ("I/O") interface 608 that can receive input from input devices or provide output to output devices. A bus 605 can also be included in the computing system 600. The bus 605 can communicatively couple one or more components of the computing system 600 and allow for communication between such components.

The computing system 600 executes program code that configures the processor 602 to perform one or more of the operations described above with respect to FIGS. 1-5. The program code of the augmented reality application 104, which can be in the form of non-transitory computer-executable instructions, can be resident in the memory device 614 or any suitable computer-readable medium and can be executed by the processor 602 or any other one or more suitable processor(s). Execution of such program code configures or causes the processor(s) to perform the operations described herein with respect to the computing system 101. In additional or alternative embodiments, the program code described above can be stored in one or more memory devices accessible by the computing system 600 from a remote storage device via a data network. The computing system 101 and any processes can use the memory device 614. The memory device 614 can store, for example, additional programs, or data such as training data 140 used by the applications executing on the processor 602 such as the augmented reality application 104 or predictive model 175.

The computing system 600 also includes at least one network interface 610. The network interface 610 includes any device or group of devices suitable for establishing a wired or wireless data connection to one or more data networks. Non-limiting examples of the network interface 610 include an Ethernet network adapter, a modem, and/or the like. The computing system 101 is able to communicate with one or more other computing devices or computer-readable data sources via a data network using the network interface 610.

The computing system 600 includes a presentation device 612. A presentation device 612 can include any device or group of devices suitable for providing visual, auditory, or other suitable sensory output. Non-limiting examples of the presentation device 612 include a monitor, a speaker, a separate mobile computing device, etc.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that, throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method for determining user behavior in an augmented reality environment, the method performed by a computing system and comprising:
   augmenting a video frame depicting a face of a person with an image of an item selected via input from a user device associated with a user;
   determining, from a video including the video frame, a score representing an action unit, wherein the action unit represents a facial expression of the person depicted by the video frame;
   providing the score to a predictive model, wherein the predictive model is trained using training data generated by:
      organizing a plurality of images of items into a Latin square comprising a plurality of rows and a plurality of columns, wherein the rows represents different users, respectively, and each of the columns for a given row represents a different item, and
      providing the plurality of images to the users, wherein each user is provided the plurality of images in a different order as compared to each of the other users;
   calculating, from the predictive model and based on the score, an indicator of intent of the person depicted by the video; and
   displaying the indicator of intent on a user interface.

2. The computer-implemented method of claim 1, further comprising:
   capturing a test video of each of a plurality of users;
   merging, in real time, the test video of each of the plurality of users with an image of a test item;
   determining, from the video frame, for each of the plurality of users, a respective score representing the action unit;
   receiving, from each of the plurality of users, a respective numerical value indicating a purchase intent of the user from the plurality of users; and
   training the predictive model by providing, for each user, the respective score and the respective numerical value.

3. The computer-implemented method of claim 2, further comprising:
providing an additional image of an additional item to each user; and
disregarding the respective score and the respective numerical value for the item and not providing the score and the respective numerical value to the predictive model.

4. The computer-implemented method of claim 1, further comprising:
responsive to determining, by the computing system, that the indicator of the intent exceeds a threshold intent, and that a measure of similarity between the item and an additional item exceeds a threshold similarity, providing a recommendation comprising the additional item to the user.

5. The computer-implemented method of claim 1, wherein the video frame represents the user at a first angle, further comprising:
receiving, by the computing system, an additional video frame depicting the face of the person, the additional video frame representing the user at a second angle;
determining, by the computing system, an additional score representing an additional action unit in the additional video frame; and
updating the indicator of intent based on the additional score.

6. The computer-implemented method of claim 1, further comprising:
providing the video frame to an additional action unit;
determining, from the video frame, an additional score representing the additional action unit;
calculating composite score comprising the score and the additional score, the composite score comprising at least one of: a minimum of the score and the additional score, a maximum of the score and the additional score, a median of the score and the additional score, or a quartile-range of the score and the additional score; and
providing the composite score to the predictive model, wherein calculating the indicator of intent is additionally based on the composite score.

7. A system comprising:
a non-transitory computer-readable medium storing computer-executable program instructions for determining user behavior in an augmented reality environment; and
a processing device communicatively coupled to the non-transitory computer-readable medium for executing the computer-executable program instructions, wherein executing the computer-executable program instructions configures the processing device to perform operations comprising:
augmenting a video frame depicting a face of a person with an image of an item selected via input from a user device associated with a user;
determining, from a video including the video frame, a score representing an action unit, wherein the action unit represents a facial expression of the person depicted by the video frame;
providing the score to a predictive model, wherein the predictive model is trained using training data generated by:
organizing a plurality of images of items into a Latin square comprising a plurality of rows and a plurality of columns, wherein the rows represents different users, respectively, and each of the columns for a given row represents a different item, and
providing the plurality of images to the users, wherein each user is provided the plurality of images in a different order as compared to each of the other users;
calculating, from the predictive model and based on the score, an indicator of intent of the person depicted by the video; and
displaying the indicator of intent on a user interface.

8. The system of claim 7, the operations further comprising:
capturing a test video of each of a plurality of users;
merging, in real time, the test video of each of the plurality of users with an image of a test item;
determining, from the video frame, for each of the plurality of users, a respective score representing the action unit;
receiving, from each of the plurality of users, a respective numerical value indicating a purchase intent of the user from the plurality of users; and
training the predictive model by providing, for each user, the respective score and the respective numerical value.

9. The system of claim 8, the operations further comprising:
providing an additional image of an additional item to each user; and
disregarding the respective score and the respective numerical value for the item and not providing the score and the respective numerical value to the predictive model.

10. The system of claim 7, the operations further comprising:
responsive to determining that the indicator of the intent exceeds a threshold intent, and that a measure of similarity between the item and an additional item exceeds a threshold similarity, providing a recommendation comprising the additional item to the user.

11. The system of claim 7, wherein the video frame represents the user at a first angle, the operations further comprising:
receiving an additional video frame depicting the face of the person, the additional video frame representing the user at a second angle;
determining an additional score representing an additional action unit in the additional video frame; and
updating the indicator of intent based on the additional score.

12. The system of claim 8, the operations further comprising:
providing the video frame to an additional action unit;
determining, from the video frame, an additional score representing the additional action unit;
calculating composite score comprising the score and the additional score, the composite score comprising at least one of: a minimum of the score and the additional score, a maximum of the score and the additional score, a median of the first score and the additional score, or a quartile-range of the score and the additional score; and
providing the composite score to the predictive model, wherein calculating the indicator of intent is additionally based on the composite score.

13. A non-transitory computer-readable storage medium storing computer-executable program instructions, wherein when executed by a processing device, the program instructions cause the processing device to perform operations comprising:

augmenting a video frame depicting a face of a person with an image of an item selected via input from a user device associated with a user;

determining, from a video including the video frame, a score representing an action unit, wherein the action unit represents a facial expression of the person depicted by the video frame;

providing the score to a predictive model, wherein the predictive model is trained using training data generated by:

organizing a plurality of images of items into a Latin square comprising a plurality of rows and a plurality of columns, wherein the rows represents different users, respectively, and each of the columns for a given row represents a different item, and     providing the plurality of images to the users, wherein each user is provided the plurality of images in a different order as compared to each of the other users;

calculating, from the predictive model and based on the score, an indicator of intent of the person depicted by the video; and displaying the indicator of intent on a user interface.

14. The non-transitory computer-readable storage medium of claim 13, wherein the program instructions further cause the processing device to perform operations comprising:

capturing a test video of each of a plurality of users;

merging, in real time, the test video of each of the plurality of users with an image of a test item;

determining, from the video frame, for each of the plurality of users, a respective score representing the action unit;

receiving, from each of the plurality of users, a respective numerical value indicating a purchase intent of the user from the plurality of users; and     training the predictive model by providing, for each user, the respective score and the respective numerical value.

15. The non-transitory computer-readable storage medium of claim 14, wherein the program instructions further cause the processing device to perform operations comprising:

providing an additional image of an additional item to each user; and     disregarding the respective score and the respective numerical value for the item and not providing the score and the respective numerical value to the predictive model.

16. The non-transitory computer-readable storage medium of claim 13, wherein the video frame represents the user at a first angle, and wherein the program instructions further cause the processing device to perform operations comprising:

receiving an additional video frame depicting the face of the person, the additional video frame representing the user at a second angle;

determining an additional score representing an additional action unit in the additional video frame; and     updating the indicator of intent based on the additional score.

17. The non-transitory computer-readable storage medium of claim 13, wherein the program instructions further cause the processing device to perform operations comprising:

providing the video frame to an additional action unit;

determining, from the video frame, an additional score representing the additional action unit;

calculating composite score comprising a first score and the additional score, the composite score comprising at least one of: a minimum of the score and the additional score, a maximum of the score and the additional score, a median of the score and the additional score, or a quartile-range of the score and the additional score; and     providing the composite score to the predictive model,     wherein calculating the indicator of intent is additionally based on the composite score.

\* \* \* \* \*